United States Patent
Watanabe

(10) Patent No.: US 8,023,074 B2
(45) Date of Patent: Sep. 20, 2011

(54) LIQUID CRYSTAL DISPLAY UNIT

(75) Inventor: Hisashi Watanabe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 930 days.

(21) Appl. No.: 11/658,837

(22) PCT Filed: Jan. 10, 2006

(86) PCT No.: PCT/JP2006/300119
§ 371 (c)(1),
(2), (4) Date: Jan. 29, 2007

(87) PCT Pub. No.: WO2006/075564
PCT Pub. Date: Jul. 20, 2006

(65) Prior Publication Data
US 2009/0002597 A1    Jan. 1, 2009

(30) Foreign Application Priority Data
Jan. 12, 2005    (JP) ................................. 2005-004740

(51) Int. Cl.
*G02F 1/1335* (2006.01)

(52) U.S. Cl. ........................................ 349/106; 349/114

(58) Field of Classification Search ........................ None
See application file for complete search history.

(56) References Cited

U.S. PATENT DOCUMENTS

| | | | |
|---|---|---|---|
| 6,195,140 B1 * | 2/2001 | Kubo et al. ..................... 349/44 |
| 2004/0114046 A1 | 6/2004 | Lee et al. | |
| 2004/0234163 A1 | 11/2004 | Lee et al. | |
| 2005/0174516 A1 * | 8/2005 | Yee et al. ..................... 349/114 |
| 2006/0119770 A1 * | 6/2006 | Ting et al. ..................... 349/114 |

FOREIGN PATENT DOCUMENTS

| | | |
|---|---|---|
| JP | 09-080434 | 3/1997 |
| JP | 2003-076342 | 3/2003 |
| JP | 2003-337327 | 11/2003 |
| JP | 2004-061747 | 2/2004 |
| JP | 2004-177726 | 6/2004 |
| JP | 2004-199071 | 7/2004 |
| JP | 2004-78215 | 11/2004 |

OTHER PUBLICATIONS

International Search Report for PCT/JP2006/300119 mailed Mar. 20, 2006 (English and Japanese).

* cited by examiner

*Primary Examiner* — Lucy Chien
(74) *Attorney, Agent, or Firm* — Nixon & Vanderhye P.C.

(57) ABSTRACT

Provided is a liquid crystal display unit that offers high visibility irrespective of the brightness of the surrounding environment and that achieves a reduction in electric power consumption as well as in cost. The liquid crystal display unit is provided with a liquid crystal layer 6, two substrates 1 and 2 that sandwich the liquid crystal layer 6, and a backlight 50 that sequentially emits light of a plurality of colors. Here, one picture element is composed of three R, G, and B pixels that serve as a reflective region, and a pixel having a transparent layer W that serves as a transmissive region. Configured in this way, in the transmissive region, the light from the backlight 50 passes through the transparent electrode 4, so that a transmissive display is performed; in the reflective region, the light is reflected from the reflective electrode 5, so that a reflective display is performed.

3 Claims, 14 Drawing Sheets

000# LIQUID CRYSTAL DISPLAY UNIT

This application is the U.S. national phase of international application PCT/JP2006/300119 filed 10 Jan. 2006, which designated the U.S. and claims priority to JP 2005-004740 filed 12 Jan. 2005, the entire content of each of which is hereby incorporated by reference.

TECHNICAL FIELD

The present invention relates to a semi-transmissive liquid crystal display unit that can offer both reflective and transmissive displays.

BACKGROUND ART

As flat-panel displays that have achieved a reduction in, for example, thickness and weight thereof, liquid crystal display units find wide application in a variety of fields including liquid crystal display televisions, monitors, and mobile phones. Various techniques for realizing colorization of such a liquid crystal display unit have been proposed. Examples of practical techniques include a color filter system and a field sequential system.

The color filter system displays images in full color by spatially mixing RGB color information by the use, in combination, of liquid crystal elements having the function of an optical shutter and a color filter in which spaces are divided into RGB three primary color regions so finely that they are imperceptible to the human eye.

On the other hand, the field sequential system has a layered structure composed of a backlight that can sequentially emit light of three colors: R, G, and B, and liquid crystal elements that display color information according to the color of light emitted by the backlight. This system displays images in full color by temporally mixing RGB color information by reducing the duration of the period during which the backlight emits light of RGB to about 16 msec, which is so short that it is imperceptible to the human eye.

Patent Document 1 discloses a liquid crystal display unit that, despite being structured as a field sequential system, can display images in color by reflecting ambient light. Moreover, Patent Document 2 discloses a liquid crystal display unit provided with a reflective region composed of colored pixels and a transmissive region having no colored portion.
Patent Document 1: JP-A-2004-061747
Patent Document 2: JP-A-2004-177726

DISCLOSURE OF THE INVENTION

Problems to be Solved by the Invention

However, the drawback of the liquid crystal display units adopting the color filter system is that the light use efficiency thereof is in general as low as 10% or less. This is mainly caused by the low light transmittance of the color filter. For example, suppose that an absorptive color filter is used. Then, depending on the density of the color filter, the light use efficiency is usually as low as about 30%.

In contrast, since the field sequential system displays images in color by using the color of light emitted by the backlight and therefore requires no color filter, the light use efficiency thereof is more than three times higher than that of the color filter system. This makes it possible to achieve a liquid crystal display unit that can display images with high brightness while consuming a low amount of electric power. However, since the field sequential liquid crystal display unit displays images in color by using the color of light emitted by the backlight, it can only offer a transmissive display exploiting the light from the backlight.

At the moment, when the liquid crystal display unit provided in mobile devices typified by mobile phones is used at night or in a relatively dim place such as indoors, it displays images by using the light from the backlight. On the other hand, when such a liquid crystal display unit is used in a well-lit place such as outdoors or a place near the window, ambient light reflected from the surface of the display unit will cause a reduction in contrast, resulting in very poor visibility. To prevent such a problem, this liquid crystal display unit is so designed as to display images by reflecting the ambient light with the light reflector provided in a pixel of a liquid crystal cell. Such a liquid crystal display unit is generally called a semi-transmissive liquid crystal display unit.

Since conventional field sequential liquid crystal display units display images in color by using the color of light emitted by the backlight, they cannot display images in color by using ambient light. This makes it impossible to use the conventional field sequential liquid crystal display unit as a semi-transmissive liquid crystal display unit for mobile devices. As a result, such a conventional field sequential liquid crystal display unit is used mainly in a display unit designed to be used in a relatively dim place such as indoors.

However, due to limited battery capacity of the mobile devices, it is a significant challenge to achieve a liquid crystal display unit that operates with less electric power consumption. For this reason, display units that offer high light use efficiency and are capable of a reflective display by the use of ambient light are keenly sought after.

This leads to the proposal of a liquid crystal display unit that is capable of transmissive and reflective displays, as disclosed in Patent Document 1. However, since the display unit disclosed in Patent Document 1 cannot display images in both reflective and transmissive modes at the same time, it is necessary to select one of the two modes by switching a driving method of liquid crystal elements in accordance with the brightness of the surrounding environment. The switching of the display mode is performed by a user of the liquid crystal display unit at his/her judgment, or performed automatically by an element that is separately provided for sensing the brightness of the surrounding environment. The problem here is that the former method is troublesome to the user, and the latter method undesirably increases the cost of components and electric power consumption. On the other hand, the display unit disclosed in Patent Document 2 uses the backlight inefficiently. This undesirably leads to an increase in electric power consumption.

An object of the present invention is to provide a liquid crystal display unit that offers high visibility irrespective of the brightness of the surrounding environment and that achieves a reduction in electric power consumption as well as in cost.

Means for Solving the Problem

To achieve the above object, in a liquid crystal display unit according to the present invention, one picture element includes at least one pixel that serves as a reflective region and at least one pixel that serves as a transmissive region. Here, liquid crystal elements disposed in the at least one pixel that serves as the transmissive region are so driven as to display color information corresponding to a color of the light emitted by a backlight.

With this configuration, it is possible to simultaneously perform a transmissive display using a field sequential system and a reflective display using the ambient light.

In the liquid crystal display unit described above, it is preferable that the reflective region be provided with a colored layer that permits light of a particular wavelength to pass therethrough.

With this configuration, it is possible to display images in color by exploiting the reflection of the ambient light. This makes it possible to display images in vivid color irrespective of the brightness of the surrounding environment, and achieve a high brightness display while consuming a low amount of electric power.

In the liquid crystal display unit described above, it is preferable that there be provided a light focusing element that focuses the light emitted by the backlight on the transmissive region. The light focusing element may be a lenticular lens or a microlens array provided on a substrate located on the side of the backlight.

With this configuration, the light emitted by the backlight is focused on the transmissive region, increasing the light use efficiency.

In the liquid crystal display unit described above, the at least one pixel that serves as the reflective region includes three different pixels, each having one of R, G, and B color filters, and the at least one pixel that serves as the transmissive region is a pixel having a transparent layer. This makes it possible to display images in full color.

Advantages of the Invention

According to the present invention, it is possible to display a transmissive display and a reflective display simultaneously. Unlike the conventional example, this eliminates the need to switch a transmissive mode and a reflective mode, and makes it possible to provide a liquid crystal display unit that offers high visibility irrespective of the brightness of the surrounding environment, that achieves a high brightness display while consuming a low amount of electric power, and that can be produced at low costs.

Figure 1:
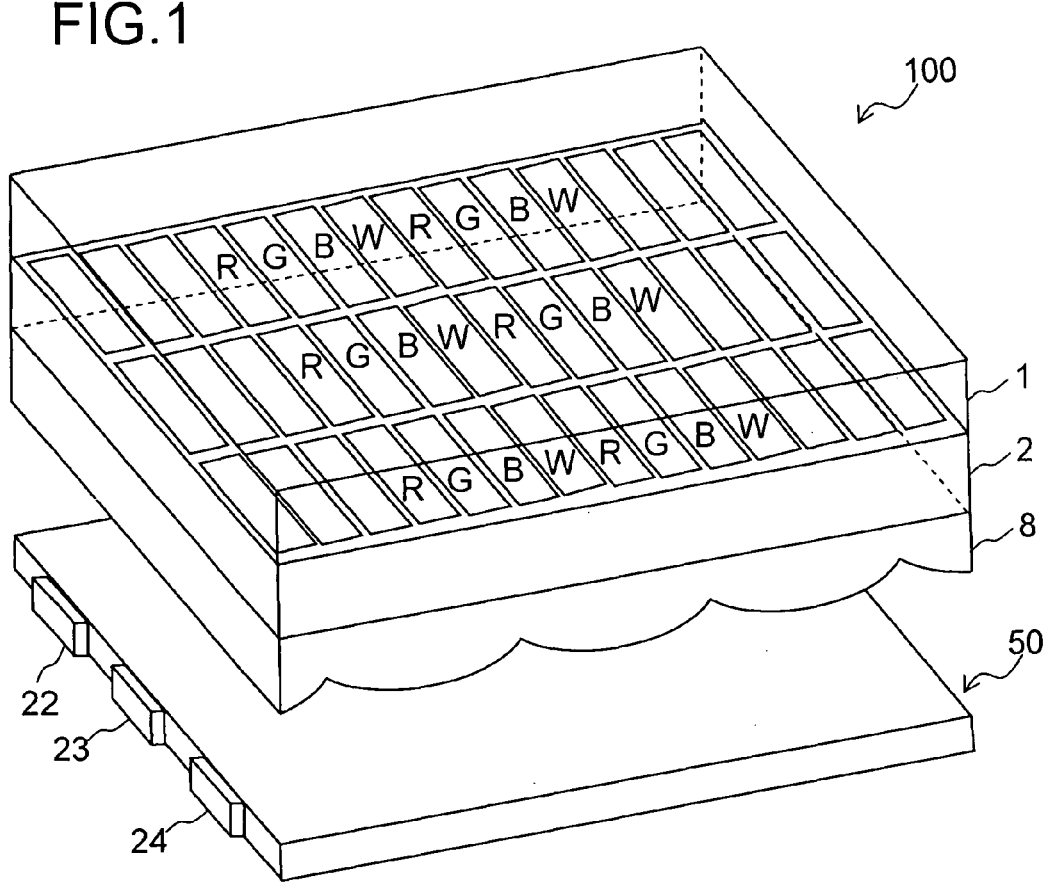
FIG. 1 A schematic perspective view of the semi-transmissive liquid crystal display unit of the present invention.

LIST OF REFERENCE SYMBOLS 1, 2 transparent substrate
3 transparent electrode
4 transparent electrode
5 reflective electrode
6 liquid crystal layer
7 color filter layer
7a black matrix
8 light focusing element
9 polarizing sheet
10 TFT
15 source bus line
16 gate bus line
17 transparent resin
21 light guide member
22 red LED
23 green LED
24 blue LED
25 reflective layer
26 prism sheet
50 backlight
100 display panel

BEST MODE FOR CARRYING OUT THE INVENTION

FIG. 1 is a schematic perspective view of the semi-transmissive liquid crystal display unit of the present invention. This semi-transmissive liquid crystal display unit is composed of a backlight 50 and a display panel 100 provided on the front face (the light emitting surface) of the backlight 50.

Figure 2:
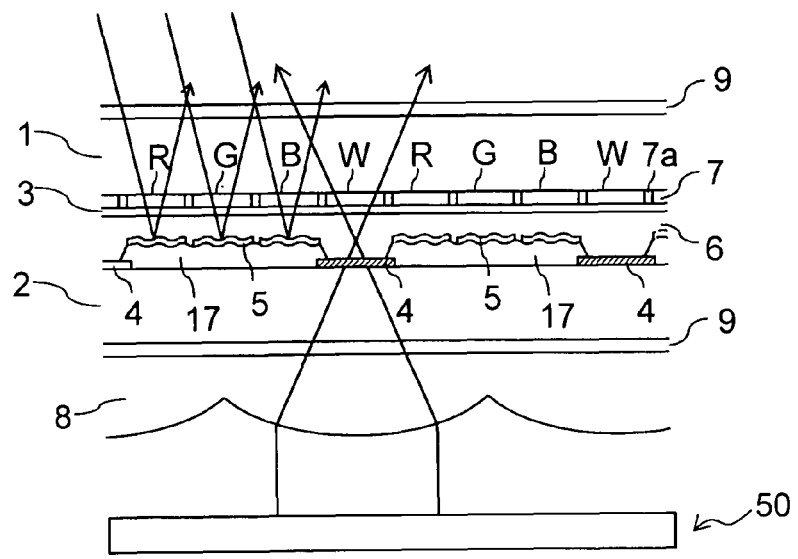
FIG. 2 A schematic sectional view of the display panel and the backlight of the present invention.

First, the display panel 100 will be described. FIG. 2 is a schematic sectional view of the display panel 100 and the backlight 50. A liquid crystal layer 6 having liquid crystal elements is sandwiched between a pair of transparent substrates 1 and 2. On the surface of the transparent substrate 1 facing the liquid crystal layer 6, a color filter layer 7 including a red (R) color filter, a green (G) color filter, a blue (B) color filter, and a transparent layer (W) is provided. The R, G, and B color filters are each a colored layer that transmits only light of the corresponding color (light of a particular wavelength), and the transparent layer W is a transparent layer that hardly absorbs light. As shown in FIG. 1, the R, G, and B color filters and the transparent layer W are arranged in a matrix. The R, G, and B color filters and the transparent layer W of the color filter layer 7 are partitioned from each other by a black matrix 7a so formed as to prevent the light from entering through gaps between the patterns.

On the surface of the color filter layer 7 facing the liquid crystal layer 6, an unillustrated transparent overcoat layer made of acrylic resin or epoxy resin is formed. On top of it, a transparent electrode 3 made of an ITO thin film is formed.

Figure 3:
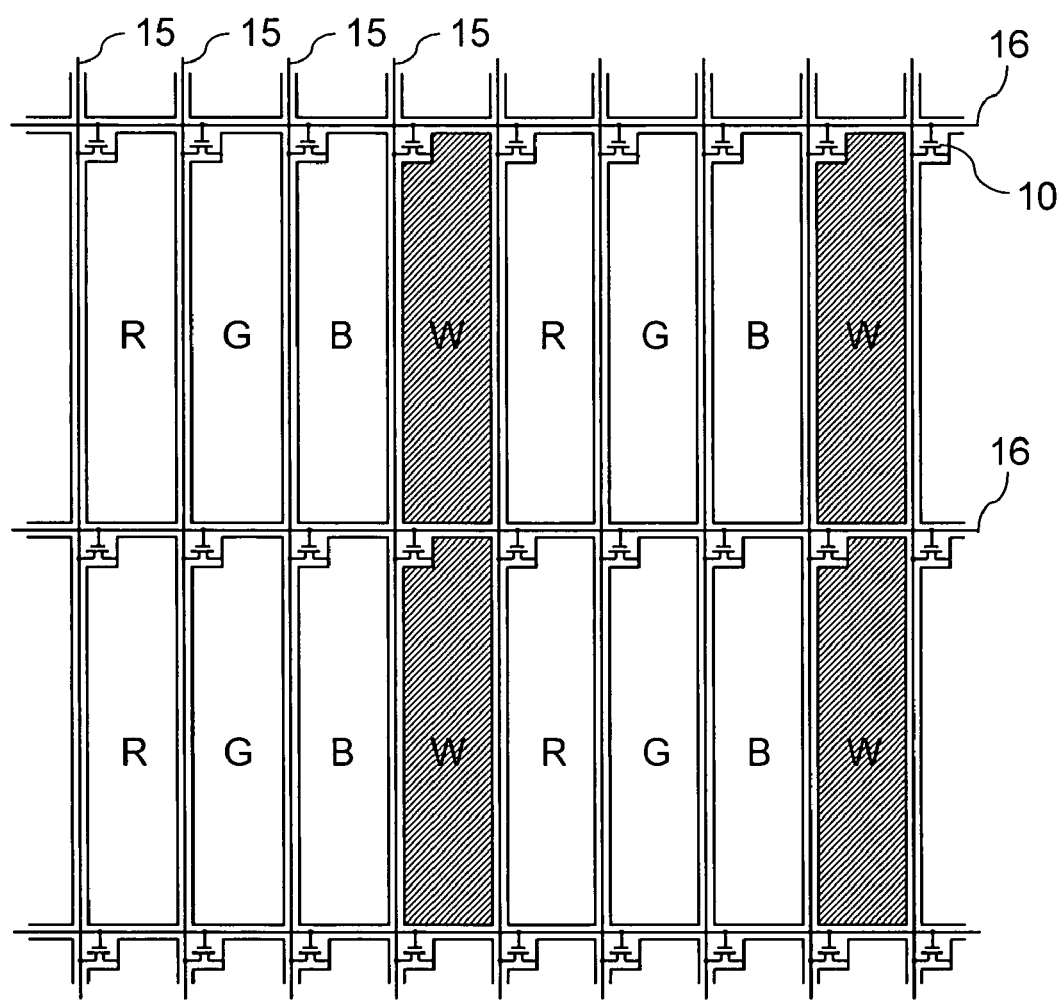
FIG. 3 A schematic plan view of the transparent substrate of the present invention.

On the surface of the transparent substrate 2 facing the liquid crystal layer 6, a TFT array for driving liquid crystal is formed. In FIG. 3, a schematic plan view of the transparent substrate 2 is shown. Source bus lines 15 and gate bus lines 16 together form a matrix, and at the intersections thereof, TFTs 10 are formed. In FIG. 3, the TFT 10 is schematically indicated by a symbol.

On the transparent substrate 2 in which the TFT array is formed, height differences are formed with a transparent resin 17 in regions corresponding to the R, G, and B color filters, and on top of them, Al thin films having a high optical reflectivity are formed as reflective electrodes 5. As a result of tiny elevations and depressions being formed on the surface of the transparent resin 17, the light incident on the reflective electrode 5 is diffusely reflected in many directions. On the transparent substrate 2 in which the TFT array is formed, in regions thereof corresponding to the transparent layers W where no transparent resin is provided, transparent electrodes 4 made of an ITO thin film are directly formed. It is to be noted that the transparent electrode 4 and the reflective electrode 5 serve as a pixel electrode for driving the corresponding liquid crystal layer 6.

The source electrode of the TFT 10 is connected to the source bus line 15, the gate electrode thereof is connected to the gate bus line 16, and the drain electrode thereof is connected to the pixel electrode (i.e. the transparent electrode 4 and the reflective electrode 5). The resultant transparent substrates 1 and 2 are applied with an unillustrated alignment film, and then an appropriate liquid crystal alignment treatment is performed thereon by rubbing. Then, the transparent substrates 1 and 2 are located in such a way as to make the electrodes formed thereon face each other with the liquid crystal layer 6 sandwiched between them.

Here, R, G, B, and W regions surrounded by the source bus lines 15 and the gate bus lines 16 are defined as pixels (pixels R, G, B, and W), and the pixels R, G, B, and W are collectively referred to as one picture element. Hereinafter, the pixels R, G, and B will also be referred to as a reflective region, and the pixel W will also be referred to as a transmissive region.

Next, as a liquid crystal alignment mode, an OCB mode that is capable of high-speed driving is used. Furthermore, on the surfaces of the transparent substrates 1 and 2 facing away from the liquid crystal layer 6, polarizing sheets 9 are attached. Additionally, above the surface of the transparent substrate 2 facing away from the liquid crystal layer 6, a lenticular lens is provided as a light focusing element 8. The lenticular lens is a lens composed of plano-convex lenses arranged in an array. The lenticular lens is formed in such a way that the vertices thereof coincide with the corresponding centers of the transmissive regions. The lenticular lens can be formed by any conventionally known formation method. Specifically, for instance, the lenticular lens is formed as follows.

First, an original mold in which the shape of a desired lenticular lens is precisely formed is made available. An ultraviolet cure resin is injected and sealed between the original mold and the transparent substrate 2 of the liquid crystal display panel 100. Then, the resin thus sealed is illuminated with ultraviolet light and cured. After the ultraviolet cure resin is completely cured, the mold is carefully removed therefrom. With this method, it is possible to produce a lenticular lens having good optical characteristics with ease and high mass productivity.

As a preferred material of the lenticular lens, an ultraviolet cure resin that has, when it is completely cured, a high degree of transparency and low birefringence is used. The lenticular lens may be formed in any other way than is specifically described above, such as an ion exchange method, photolithography, or a thermal sagging method.

Although the descriptions heretofore deal with a case in which the lenticular lens is used as the light focusing element 8, it is also possible to use a microlens array in which bowl-shaped lenses are arranged in an array.

Figure 4:
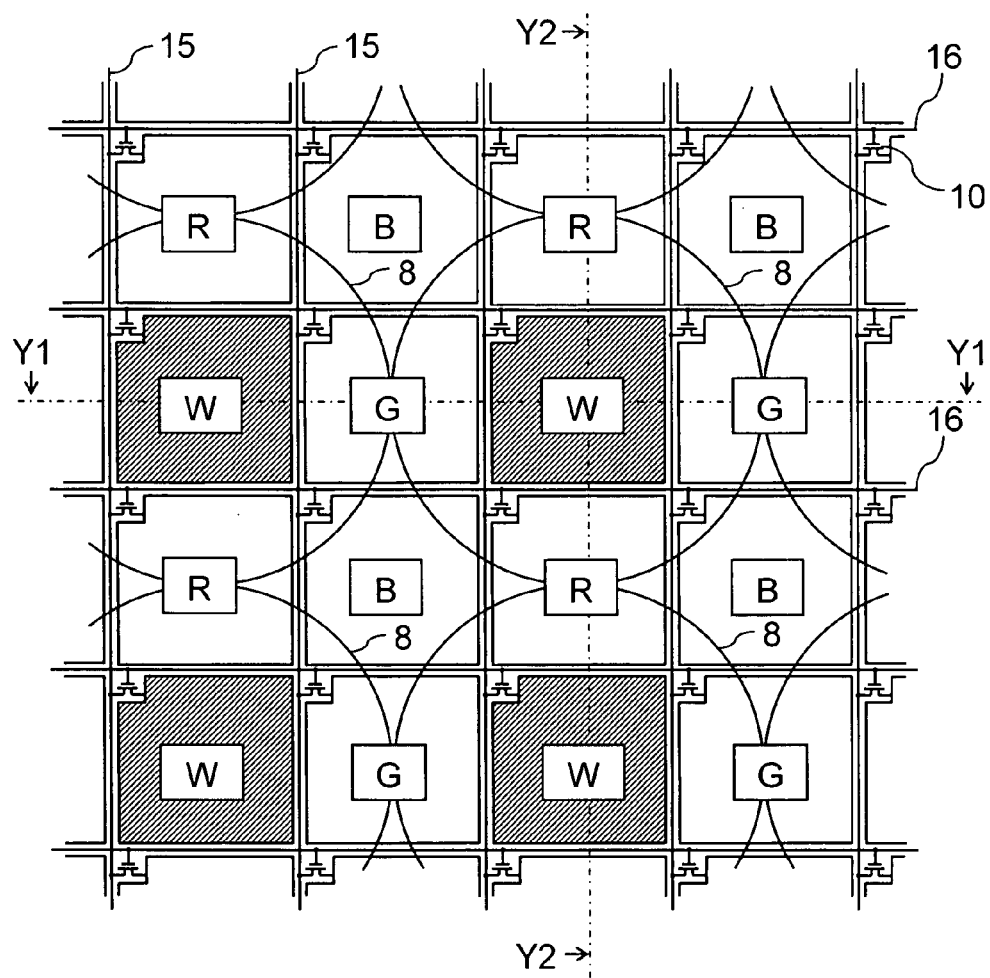
FIG. 4 A schematic plan view of the transparent substrate of another embodiment of the present invention.

The case in which a microlens array is used will be described by using FIG. 4, which is a schematic plan view thereof. Since the microlens is a bowl-shaped lens having a curvature on the left, right, top, and bottom thereof, it is preferable that the microlens array be arranged in a grid and the vertices of the microlens array coincide with the corresponding centers of the transmissive regions in order to focus light efficiently. In FIG. 4, the R, G, and B color filters and the transparent layer W are arranged in a grid, and the microlens array is so formed that the vertices thereof coincide with the corresponding centers of the transmissive regions, i.e. the pixels W.

Although there is no specific limit to the order in which the R, G, and B color filters and the transparent layer W are arranged, it is preferable that the transparent layer W with high brightness and the G color filter with high visibility be contiguously arranged lengthwise or side by side. This is because it is thereby possible to produce clearer images, particularly images including many text displays or straight lines, for example.

Figure 5:
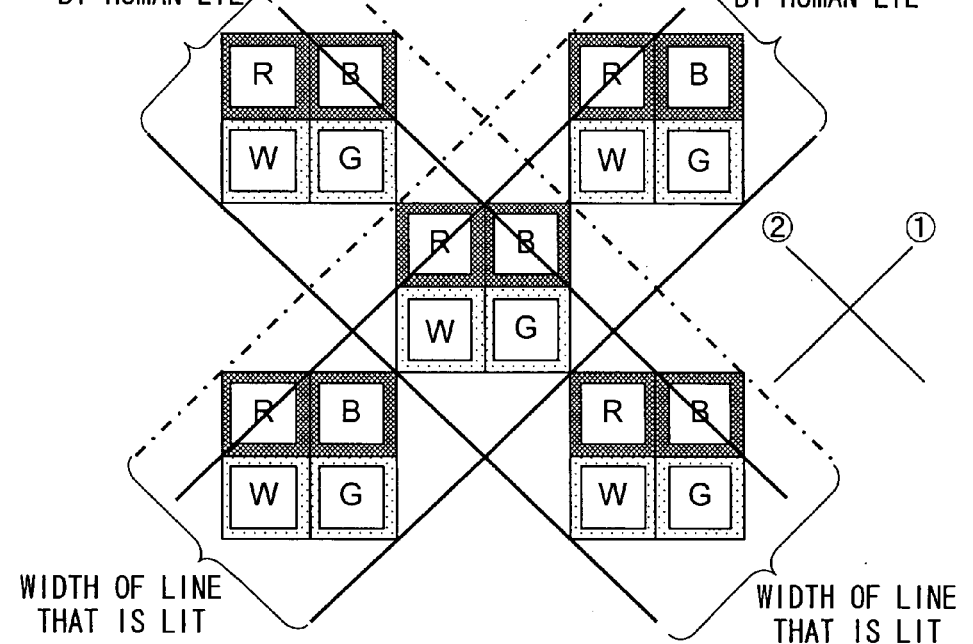
FIG. 5 A display example in which the transparent layer and the G color filter are arranged side by side.
Figure 6:
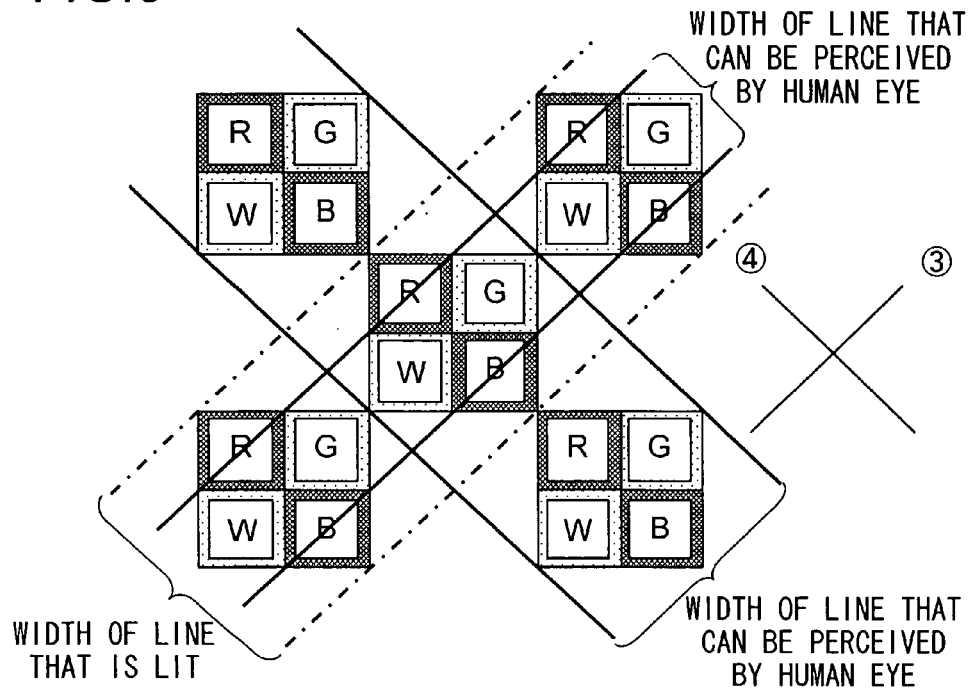
FIG. 6 A display example in which the transparent layer and the G color filter are arranged diagonally.

Hereinafter, an example in which white lines are displayed on a black background will be described by using FIGS. 5 and 6. First, a case shown in FIG. 5 where the transparent layer W and the G color filter are arranged side by side will be described. When a diagonal line 2) extending from the bottom right to the top left and a diagonal line 1) extending from the bottom left to the top right are displayed, the widths of the lines 1) and 2) created by the lit pixels are the same. Although to the human eye the width of the lines appears to be narrower than the actual width of the lines created by the lit pixels because of the difference in visibility of colors, the widths of the lines 1) and 2) appear to be substantially the same to the human eye.

Next, a case shown in FIG. 6 where the transparent layer W and the G color filter are diagonally arranged will be described. When a diagonal line 4) extending from the bottom right to the top left and a diagonal line 3) extending from the bottom left to the top right are displayed, the widths of the lines 3) and 4) created by the lit pixels are the same. However, to the human eye the widths of the lines appear to be narrower than the actual widths of the lines created by the lit pixels because of the difference in visibility of colors. The above-described case differs from the case described in FIG. 5 in that the extents to which the widths of lines 3) and 4) appear to be narrower than the actual widths to the human eye are different. That is, the widths of the lines 3) and 4) appear to be different to the human eye. An asymmetrical display is undesirable because it causes discomfort to the human eye.

Figure 7:
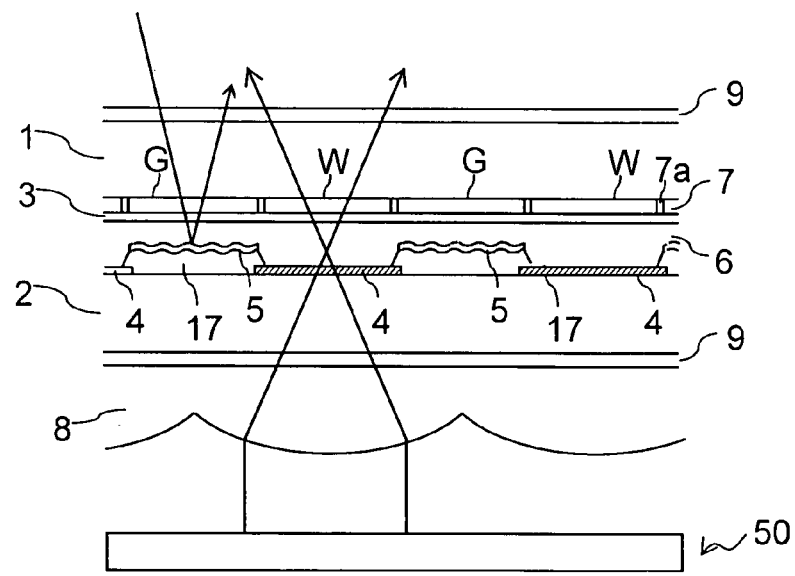
FIG. 7 A schematic sectional view of the display panel and the backlight of another embodiment of the present invention.
Figure 8:
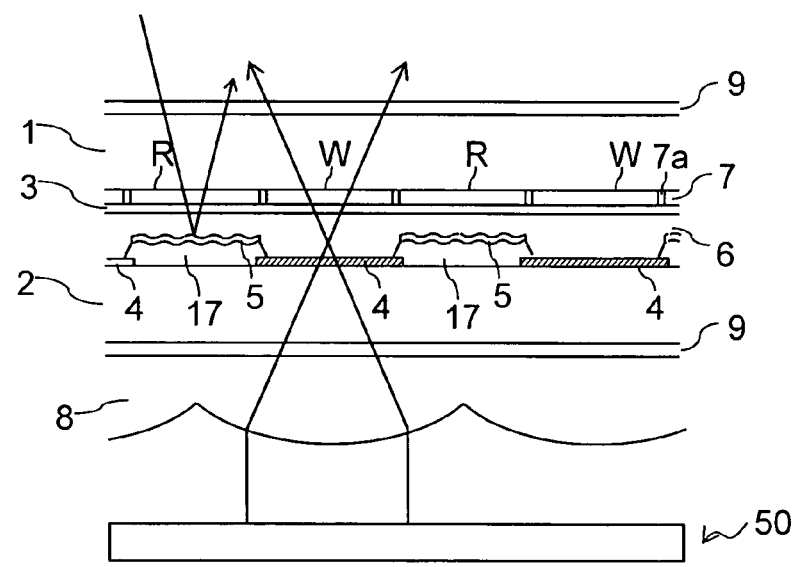
FIG. 8 A schematic sectional view of the display panel and the backlight of still another embodiment of the present invention.

FIG. 7 is a sectional view taken on the line Y1-Y1 of FIG. 4, and FIG. 8 is a sectional view taken on the line Y2-Y2 of FIG. 4. The principal portion of the panel has a configuration similar to that described in the example described above wherein the lenticular lens is used, and overlapping explanations will be omitted.

Figure 9:
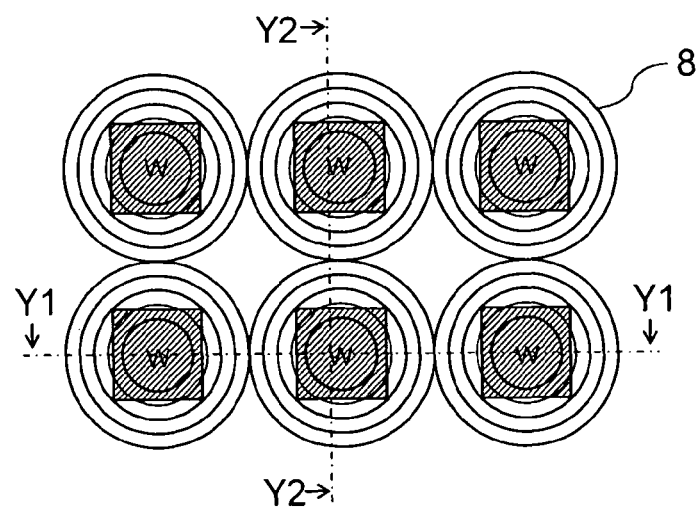
FIG. 9 A schematic plan view of the microlens of another embodiment of the present invention, as indicated by the contour lines.
Figure 10:
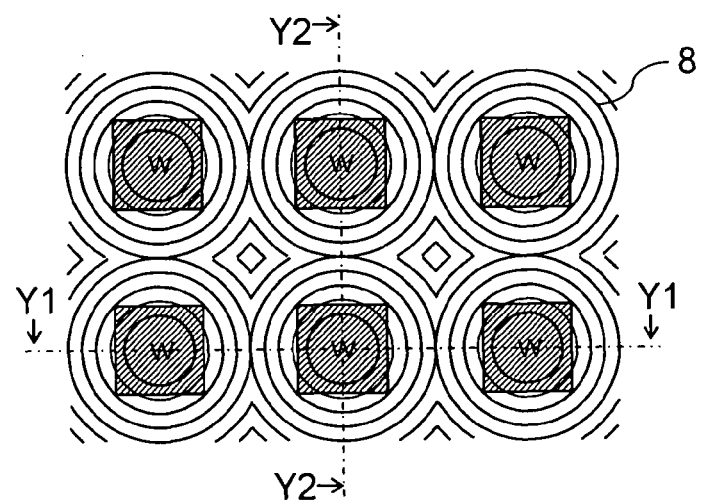
FIG. 10 A schematic plan view of the microlens of still another embodiment of the present invention, as indicated by the contour lines.
Figure 11:
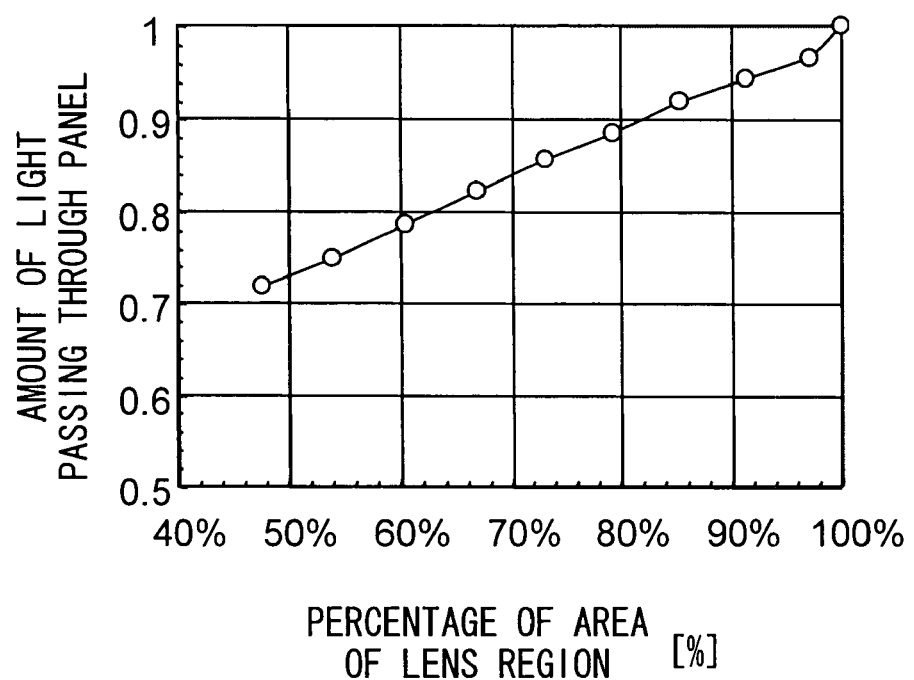
FIG. 11 A graph showing the amount of light passing through the display panel relative to the percentage of the area of the lens region.

FIGS. 9 and 10 each show an example of the shape of the microlens array, as indicated by the contour lines. In FIG. 9, lenses are not formed in some regions between the lenses; in FIG. 10, lenses are formed in all regions. FIG. 11 illustrates a graph showing the percentage of the area of the lens region and the amount of light passing through the display panel. As will be understood from the graph, the smaller the lens region, i.e. the greater the non-lens region, the smaller the amount of light passing through the display panel. Therefore, from the viewpoint of light focusing efficiency, forming lenses in all regions as shown in FIG. 10 is preferable to leaving a non-lens region as shown in FIG. 9. The microlens array can be formed with ease in a similar manner to the lenticular lens.

In FIG. 4, the R, G, and B color filters and the transparent layer W are arranged in a grid. However, the present invention is not limited thereto. The R, G, and B color filters and the transparent layer W may be arranged in any other way than is specifically described above. However, since the microlens has an isotropic shape, it is preferable that the transparent layer W also have an isotropic shape, so that the light focusing spot of the microlens coincides with the transparent layer W. This is because it is thereby possible to cause light to pass through the transparent layer W efficiently. More specifically, it is preferable that the transparent layer W have nearly isotropic shape, such as the shape of a circle, square, regular hexagon, or regular octagon.

Figure 12:
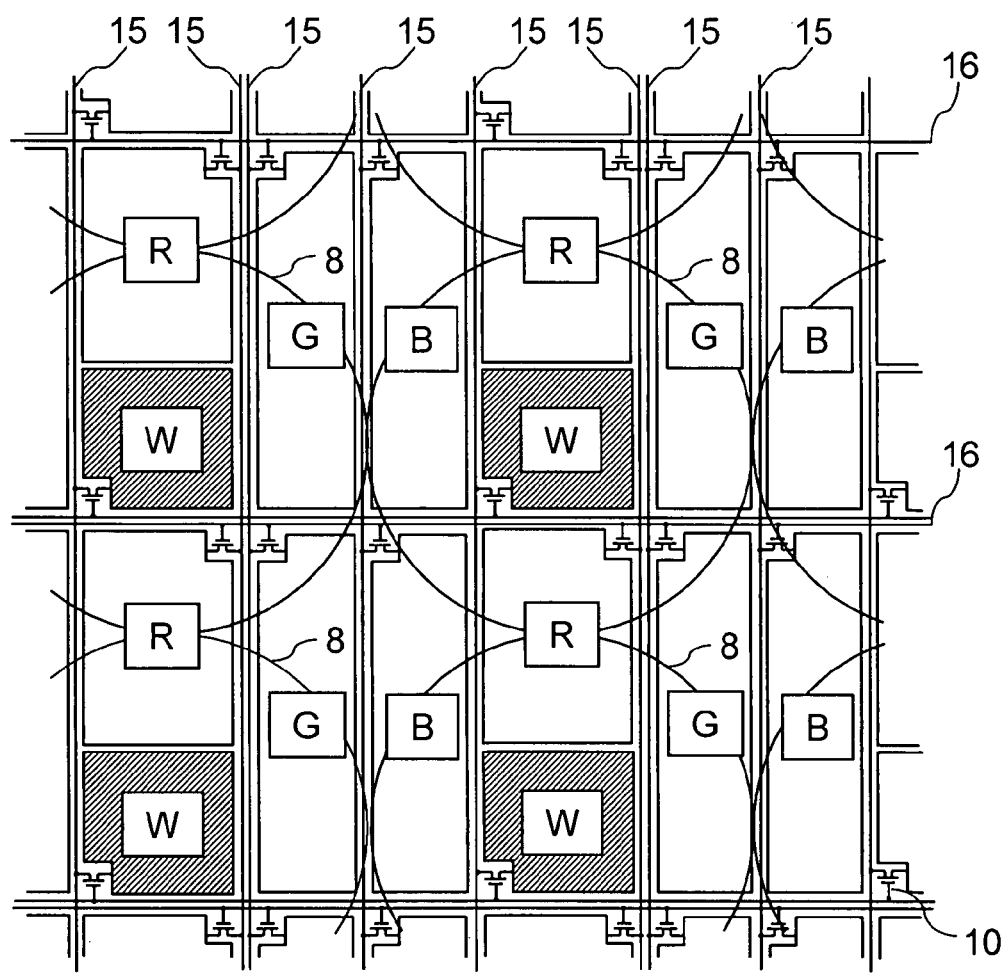
FIG. 12 A schematic plan view of the transparent substrate of still another embodiment of the present invention.
Figure 13:
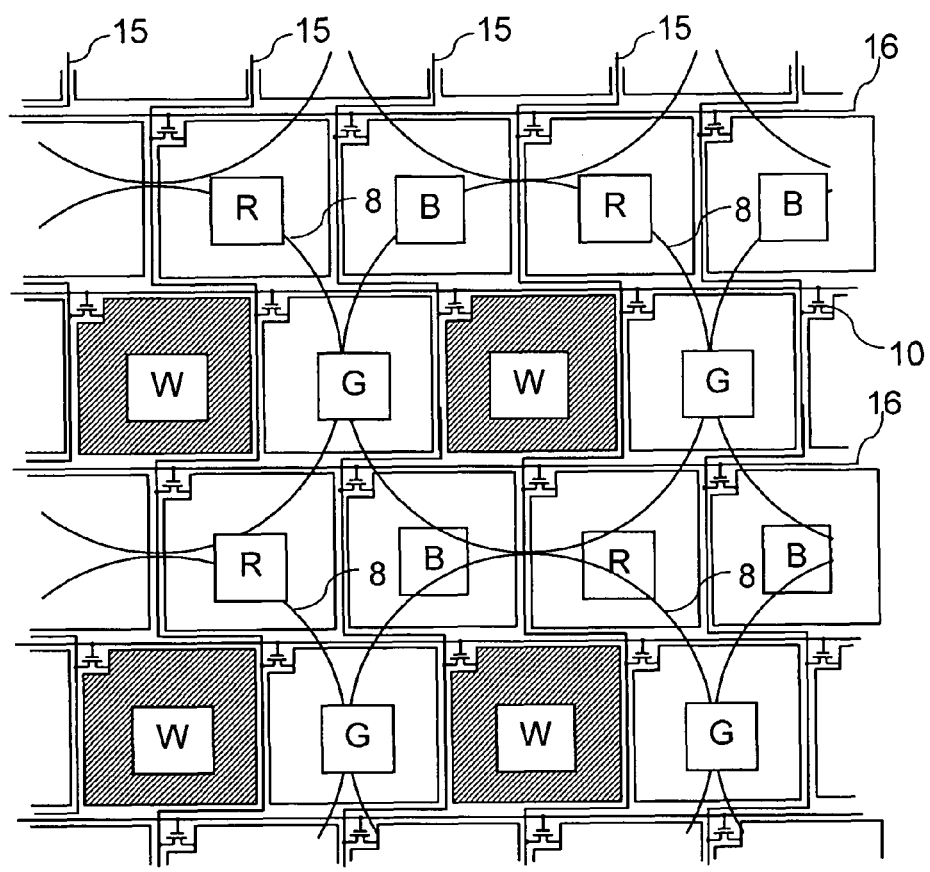
FIG. 13 A schematic plan view of the transparent substrate of still another embodiment of the present invention.
Figure 22:
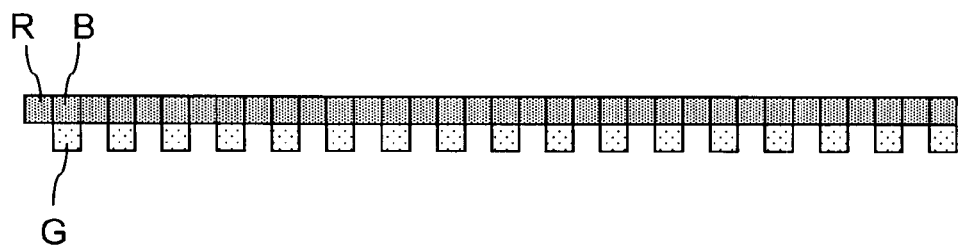
FIG. 22 A diagram illustrating the reflective display shown in FIG. 4.
Figure 23:
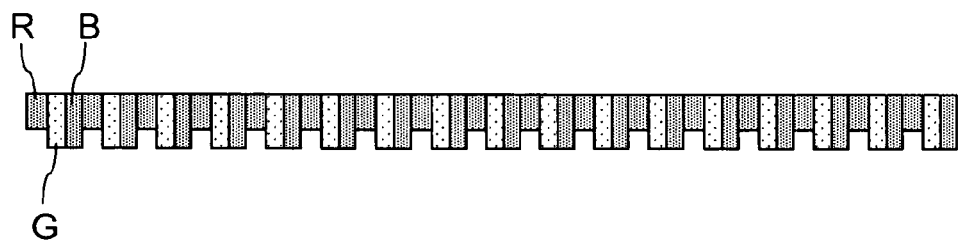
FIG. 23 A diagram illustrating the reflective display shown in FIG. 12.

FIG. 12 shows the configuration in which R, G, and B are arranged side by side in the lateral direction (first direction), and the transparent layer W is arranged in the lengthwise direction (second direction: a direction perpendicular to the first direction) in such a way that the pixels R, G, B, and W together form a rectangle. In a case where a white straight line is displayed on a black background in a lateral direction in which R, G, and B are arranged, as shown in FIG. 23, R, G, and B mix more easily than when they are arranged as shown in FIG. 4, making the resultant straight line sharp and clear (with the configuration shown in FIG. 4, as shown in FIG. 22, the high brightness of the pixel G makes it appear that the pixel G sticks out of the line of RB). Moreover, in an example shown in FIG. 13, the pixels are arranged in a delta arrangement. Such an arrangement is particularly desirable in terms of definition for specialized display units for image display, such as monitors for digital cameras and camcorders.

Figure 14:
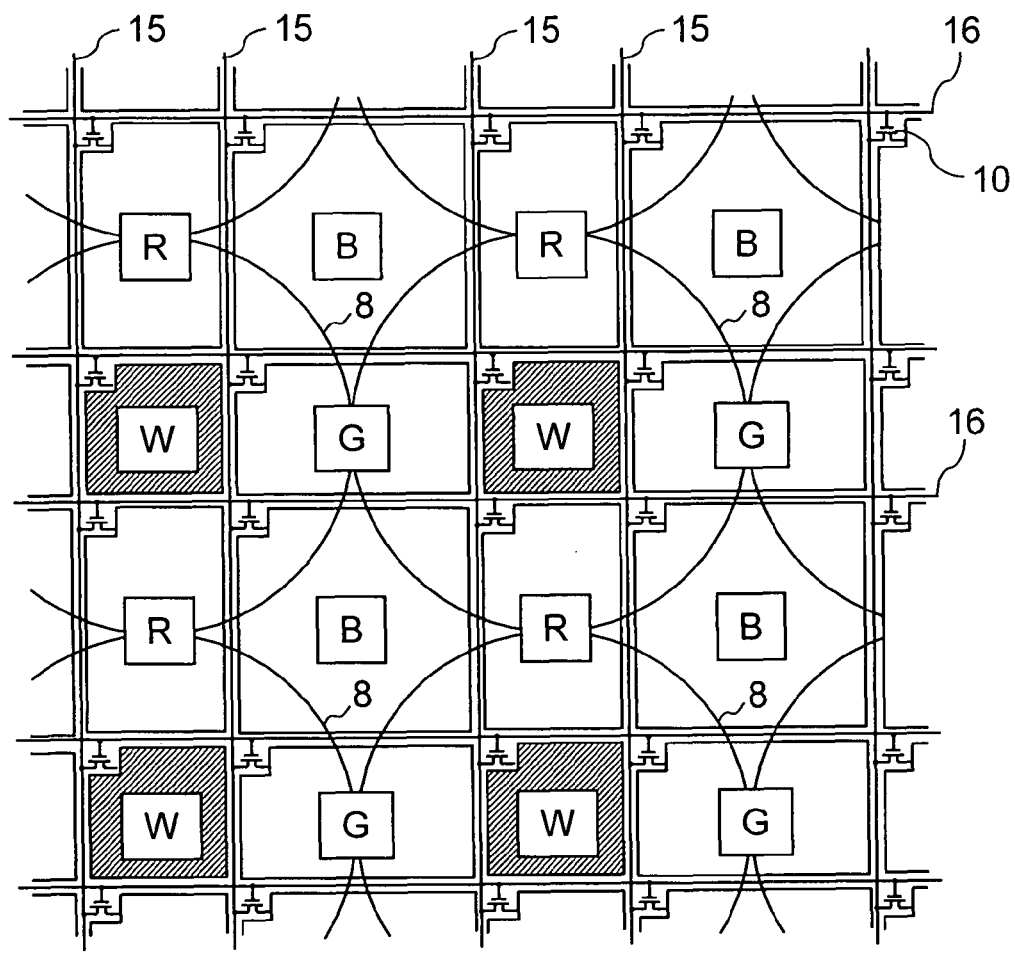
FIG. 14 A schematic plan view of the transparent substrate of still another embodiment of the present invention.

Furthermore, by changing the ratio between the average area of the R, G, and B color filters and the area of the transparent layer W, it is possible to control the ratio between the brightness of the reflective mode and that of the transmissive mode. For example, in a case where, like the configuration shown in FIG. 14, the average area of the R, G, and B color filters is larger than the area of W, ambient light reflectivity is increased, making it possible to achieve a bright reflective mode. This is particularly desirable for display units designed for outdoor use. Alternatively, particularly in the case of light focusing elements having a high light focusing efficiency, such as a microlens array, the transmittance of light passing through the panel is increased even when the area of the transparent layer W is small. This is desirable in that it helps increase the brightness of both the reflective and transmissive modes.

Figure 15:
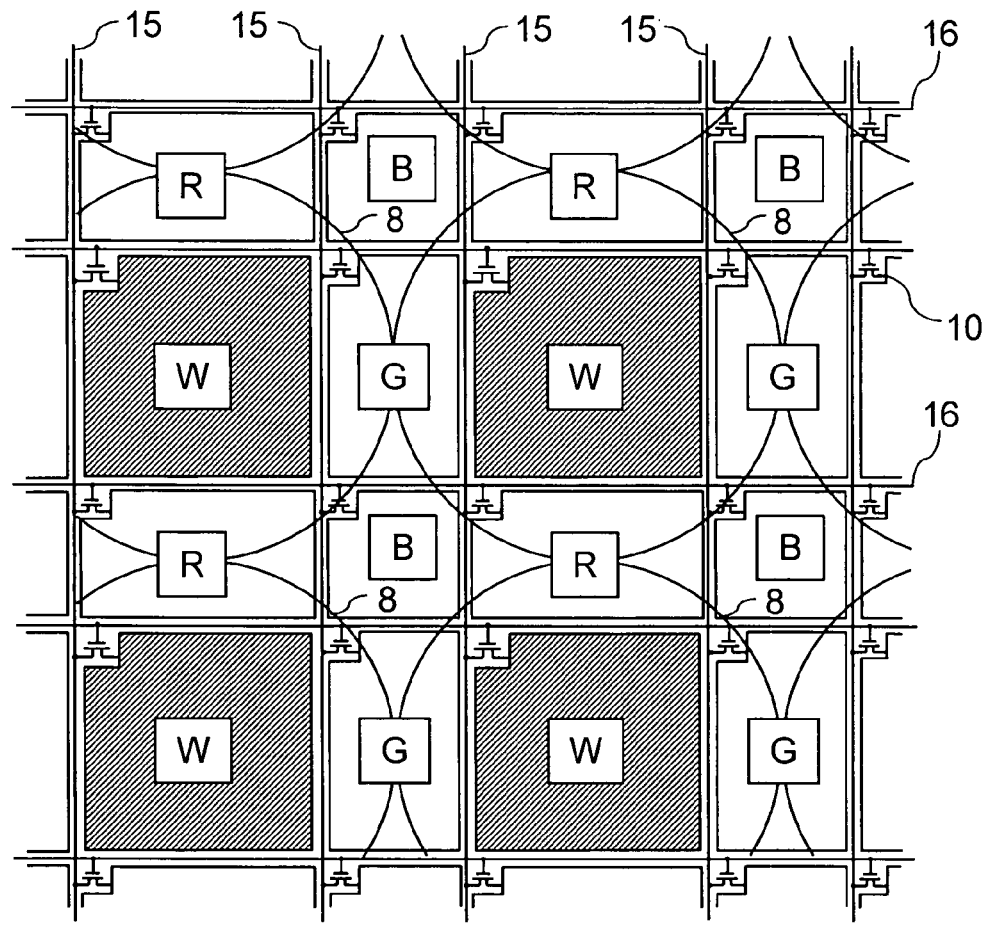
FIG. 15 A schematic plan view of the transparent substrate of still another embodiment of the present invention.

On the other hand, in a case where, like the configuration shown in FIG. 15, the area of the transparent layer W is larger than the average area of the R, G, and B color filters, it is possible to achieve a bright transmissive mode. This is particularly desirable in a case where no light focusing element 8 is provided for cost reduction.

Figure 16:
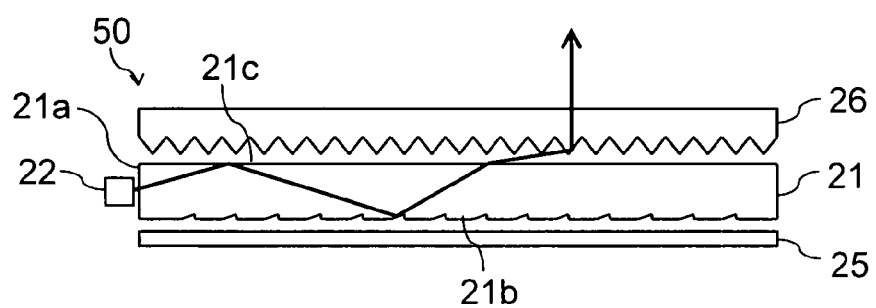
FIG. 16 A schematic sectional view of the backlight of the present invention.

Next, the backlight 50 will be described. FIG. 16 is a schematic sectional view of the backlight 50. The backlight 50 is composed of three color light sources using a red LED 22, a green LED 23, and a blue LED 24 (see FIG. 1), a light guide member 21 that guides light emitted by the light source, a reflective layer 25, and a prism sheet 26. By making the three color light sources sequentially emit light, the backlight 50 can sequentially emit light of RGB. For example, the backlight 50 sequentially emits light of three colors: R, G, and B, at intervals of about 16 msec (about 5 msec per color).

In order to make the light focusing element 8 focus a sufficient amount of light emitted by the backlight 50 on the transmissive region of the display panel, it is preferable that the light emitted by the backlight 50 have a high degree of parallelism. The backlight 50 described below can emit light with a high degree of parallelism in a predetermined direction.

The red LED 22, the green LED 23, and the blue LED 24 are securely attached to a light entrance surface 21a of the light guide member 21 in such a way as to prevent leakage of light. If these LEDs have high directivity, it is preferable that the light entrance surface 21a be a scattering surface because this increases the brightness uniformity. In a bottom surface 21b of the light guide member 21, fine prisms are formed that have planes in a direction perpendicular to the direction in which the light is guided.

Figure 17:
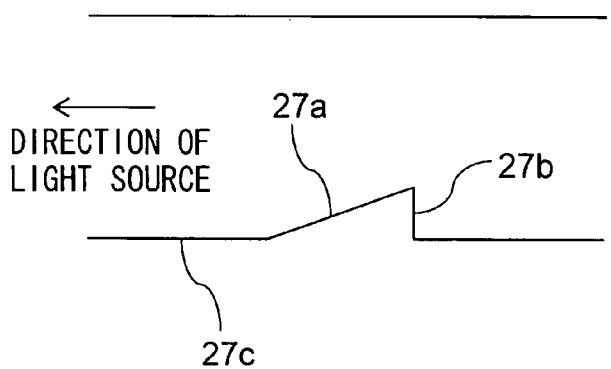
FIG. 17 An enlarged view of a prism of the present invention.

FIG. 17 is an enlarged view of one prism. In this embodiment, a prism plane 27a facing the light source and a non-prism plane 27c form an angle of about 12°, and a prism plane 27b that is not located on the light source side and the non-prism plane 27c form an angle of 90°.

As is the case of the lenticular lens described above, the light guide member 21 having fine prism planes can be formed with high precision by resin molding using an original mold. Used as a material thereof is, for example, resin having a high degree of transparency, such as acrylic resin. Though not shown in FIG. 17, to increase the in-plane brightness uniformity of the backlight 50, it is preferable that the pitches of the prisms decrease with distance from the light source.

Moreover, as the reflective layer 25, it is possible to use a PET film on which a metal thin film such as silver or aluminium is formed, and, as the prism sheet 26, it is possible to use DIAART™ manufactured by MITSUBISHI RAYON CO., LTD. The surface of the prism sheet 26 located on the light guide member 21 side has formed therein elevations and depressions.

The light sequentially emitted from the LEDs 22, 23, and 24 enters the light guide member 21, passes through the inside of the light guide member 21, and is then reflected from the prism plane 27a. In this way, the light is emitted toward the prism sheet 26 side. Alternatively, the light emitted toward the reflective layer 25 side is reflected from the reflective layer 25, and is then emitted toward the prism sheet 26. The light emitted from the light guide member 21 enters the prism sheet 26, and is then reflected from the elevations and depressions formed in the prism sheet 26 in the direction of the normal to the light guide member 21. The thus obtained backlight 50 was found to be able to emit light with a high degree of parallelism, such that the half-peak width of the brightness is about ±10°.

The light having a high degree of parallelism is emitted from the backlight 50, is focused by the light focusing element 8 on the transmissive region of the display panel 100, and then passes through the display panel 100 with a high degree of efficiency. This permits even a display panel 100 having low transmittance (low aperture ratio) to use the light from the backlight 50 with high light use efficiency. This helps achieve a liquid crystal display unit that offers high brightness and low electric power consumption.

This embodiment deals with a case where the LEDs emitting light of R, G, and B are used as a light source. It is needless to say, however, that the LED used in the present invention is not limited to this specific type, but may be of any other type, such as an LED that can emit light of R, G, and B with only one chip. Alternatively, it is also possible to use a light source of any other type, such as a fluorescent tube. Moreover, a plurality of light sources may be disposed according to the size of the light guide member 21.

Figure 18:
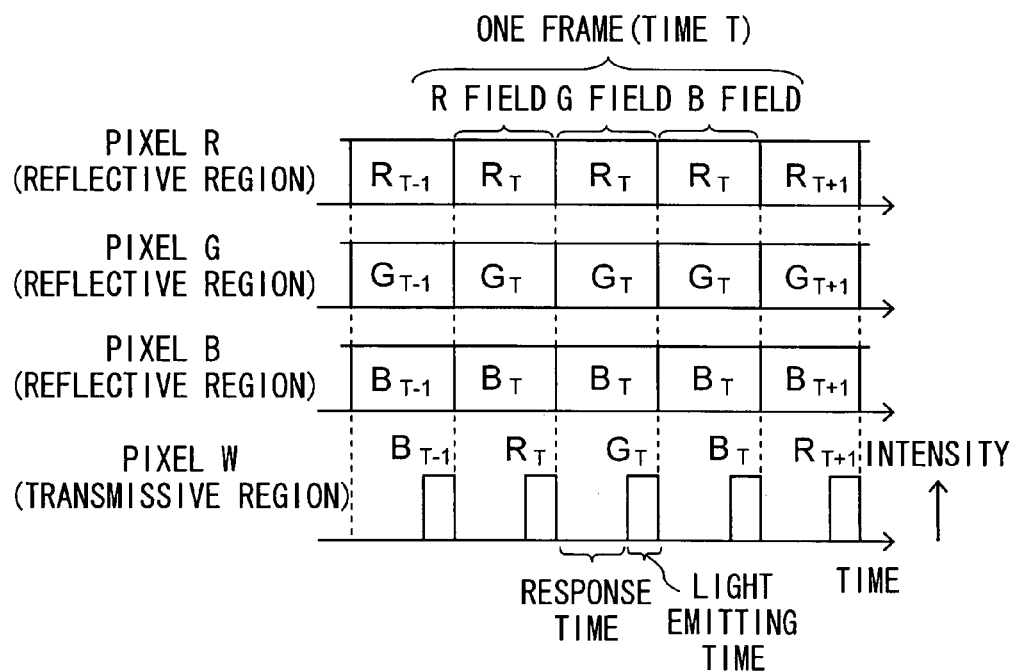
FIG. 18 A diagram showing the temporal progression of the display intensity of each pixel of the present invention.

Hereinafter, a driving method of the semi-transmissive liquid crystal unit described above will be described. FIG. 18 shows the temporal progression of the display intensity of each pixel. The following description assumes that a period in which the backlight 50 emits light of three primary colors: R, G, and B, is one frame. In this embodiment, one frame is assumed to be 16.5 msec. Throughout the following description, it is assumed that one frame is composed of three fields, and each field is referred to as an R field, a G field, or a B field according to the color of light emitted by the backlight 50. If it is assumed that one frame is 16.5 msec, each field is 5.5 msec.

At the start of each field, a specific voltage is applied to a pixel electrode disposed in each pixel, thereby driving the liquid crystal elements. Assume that the color intensities of R, G, and B at a given time T are RT, GT, and BT, respectively. Then, in the pixels R, G, and B, at the start of their respective fields, voltages corresponding to the color intensities RT, GT, and BT are applied to the liquid crystal elements, and the ambient light that is regularly entering is reflected. In this way, display is performed.

In the pixel W, at the start of the R, G, and B fields, voltages corresponding to the color intensities RT, GT, and BT are applied respectively. In the pixel W, only after the liquid crystal elements are driven and reach a state stable enough to display each color information, the backlight 50 emits light of a corresponding color. In this way, display is performed. Here, assume that the time from when a voltage is applied to the liquid crystal elements till when the driving is completed is referred to as a response time, and the time in which the backlight 50 is emitting light is referred to as a light emitting time. Then, the light emitting time is about 1.5 msec because, in the case of an OCB mode, the response time is about 4 msec. Since different pieces of color information periodically displayed in the pixel W are switched so quickly that they are imperceptible to the human eye, they are mixed temporally and recognized as a color display.

Since the liquid crystal display unit constructed as described above can simultaneously perform a reflective display in which the ambient light is reflected and a transmissive display using the backlight 50, it offers high visibility irrespective of the brightness of the surrounding environment. Incidentally, the longer the light emitting time of the backlight 50, the higher the display brightness. This makes it preferable to make the response speed of the liquid crystal elements as fast as possible, such that the driving of the liquid crystal elements is completed as quickly as possible. Moreover, to reduce the influence of color breaking, it is preferable that the time of one frame be as short as possible.

It is to be noted that the liquid crystal display unit described above does not necessarily have a light focusing element 8. Although the absence of the light focusing element 8 reduces the transmission brightness because the light from the backlight 50 is not always focused on the transparent layer W, it eliminates the need to form a fine light focusing element 8. This helps achieve a semi-transmissive liquid crystal unit that can perform a satisfactory display at a relatively low cost.

Figure 19:
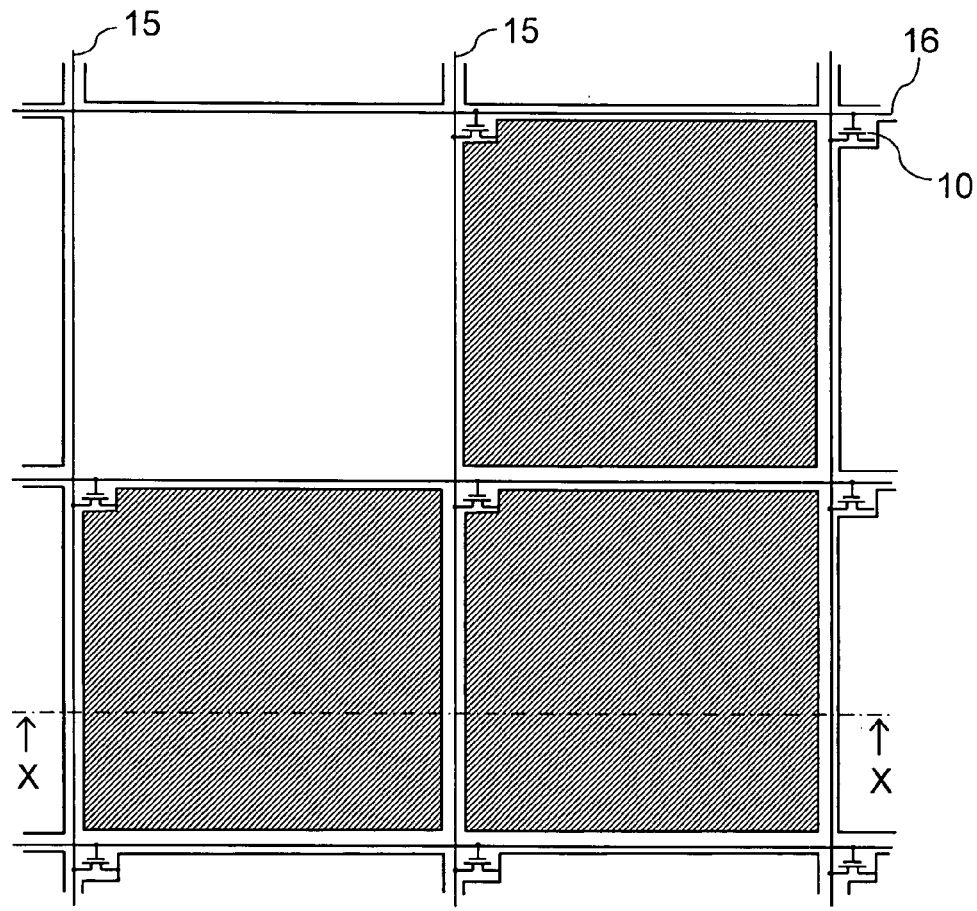
FIG. 19 A schematic plan view of the transparent substrate of the field sequential liquid crystal display unit of a comparative example.
Figure 20:
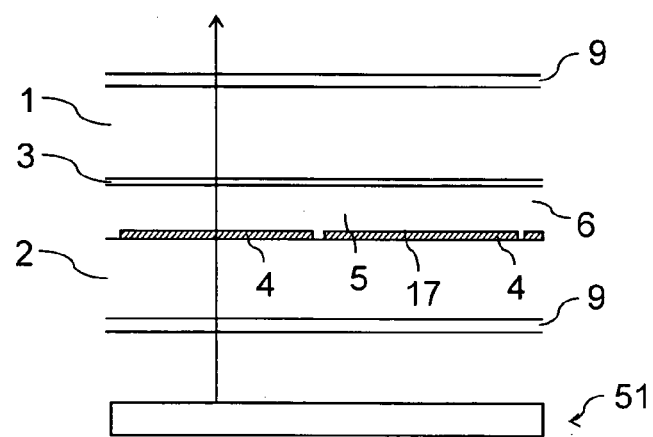
FIG. 20 A sectional view taken on the line X-X of FIG. 7.

Hereinafter, as a comparative example, a commonly-used field sequential liquid crystal display unit will be described. FIG. 19 is a schematic plan view of the transparent substrate of a commonly-used field sequential liquid crystal display unit, and FIG. 20 is a sectional view taken on the line X-X of FIG. 19.

On the surface of a transparent substrate 1 facing a liquid crystal layer 6, a transparent electrode 3 made of an ITO thin film is formed. On the surface of a transparent substrate 2 facing the liquid crystal layer 6, a TFT array for driving liquid crystal is formed. Source bus lines 15 and gate bus lines 16 together form a matrix, and at the intersections thereof, TFTs 10 are formed. The drain electrode of the TFT is connected to the source bus line 15, the gate electrode thereof is connected to the gate bus line 16, and the source electrode thereof is connected to a pixel electrode 4. The pixel electrode 4, which is made of an ITO thin film, is transparent and has high light transmittance.

Figure 21:
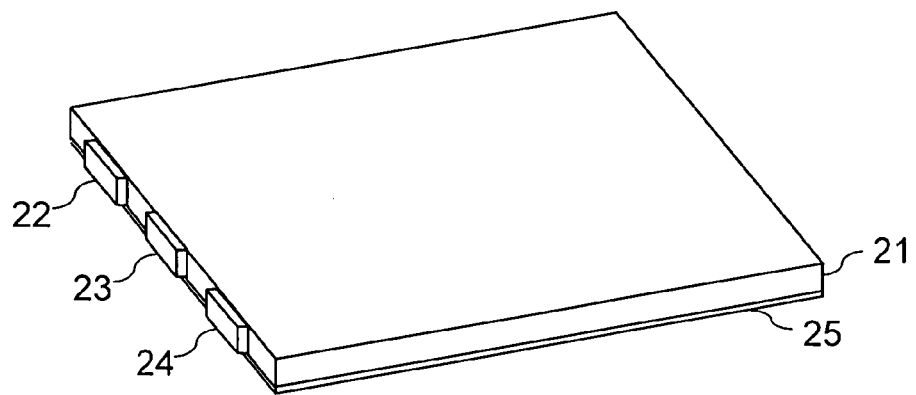
FIG. 21 A schematic perspective view of the backlight of a comparative example.

FIG. 21 is a schematic perspective view of a backlight 51. Used as the backlight 51 is a backlight that emits light by using a diffusion pattern. Used as a light source is LEDs that emit light of R, G, and B.

The way of driving the liquid crystal elements is similar to that for the pixel W described above. That is, in each pixel, at the start of the R field, a voltage corresponding to the color intensity RT is applied, at the start of the G field, a voltage corresponding to the color intensity GT is applied, and at the start of the B field, a voltage corresponding to the color intensity BT is applied. Then, only after the liquid crystal elements are driven and reach a state stable enough to display each color information, the backlight emits light of a corresponding color. In this way, display is performed.

In order to compare the screen brightness of the liquid crystal display unit of the present invention with that of the liquid crystal display unit of the comparative example, observations were made in bright light at 1000 lux or more, such as outdoors or a place near the window on a bright or cloudy day, and in dim light at 1000 lux or less, such as indoors or at night. As a result of comparison, it was found that the liquid crystal display unit of the present invention provided with the light focusing element 8 could offer a satisfactory display in both bright and dim light. By contrast, it was found that, although the liquid crystal display unit of the present invention provided with no light focusing element 8 could offer in bright light a display equivalent to that of the liquid crystal display unit of the present invention provided with the light focusing element 8, it suffered from a slight reduction in brightness in dim light. Moreover, it was found that, although the liquid crystal display unit of the comparative example could offer a satisfactory display in dim light, it could barely display recognizable images in bright light.

INDUSTRIAL APPLICABILITY

Liquid crystal display units according to the present invention find wide application in liquid crystal display televisions, monitors, mobile phones, PDAs, notebook personal computers, and the like. A semi-transmissive configuration can be used effectively, especially in mobile devices.

The invention claimed is:

1. A liquid crystal display unit comprising:
liquid crystal elements;
two substrates that sandwich the liquid crystal elements; and
a backlight that sequentially emits light of a plurality of colors, wherein
a picture element including: at least one pixel that serves as a reflective region, at least one pixel that serves as a transmissive region, and the liquid crystal elements disposed in the at least one pixel that serves as the transmissive region are so driven as to display color information corresponding to a color of the light emitted by the backlight;
a light focusing element that focuses the light emitted by the backlight on the transmissive region;
the light focusing element is a microlens array provided on the substrate located on a side of the backlight;
wherein the at least one pixel that serves as the reflective region comprises three different pixels, each having one of red, green, and blue color filters, and the at least one pixel that serves as the transmissive region is a pixel comprising a transparent layer,
the three different pixels, each having one of red, green, and blue color filters, are arranged side by side in a first direction, wherein said three different pixels with the red, green and blue color filters and the pixel having the transparent layer are separately addressable via first, second, third and fourth switching elements, respectively,
the pixel comprising the transparent layer is arranged in a second direction with the pixel having only the red color filter, the second direction being perpendicular to the first direction, such that the three different pixels, each having one of red, green, and blue color filters and the pixel having the transparent layer together form a rectangle, and
the microlens array is formed in such a way that constituent microlenses thereof each coincide with a center of the pixel having the transparent layer.

2. The liquid crystal display unit of claim 1, wherein the transparent layer has an isotropic shape.

3. The liquid crystal display unit of claim 1, wherein the transparent layer has a shape of a circle, square, regular hexagon, or regular octagon.

* * * * *